United States Patent

[11] 3,567,070

| [72] | Inventor | Jerry D. Gordon |
| | | 10,749 E. 11th St., Tulsa, Okla. 74128 |
| [21] | Appl. No. | 813,670 |
| [22] | Filed | Apr. 4, 1969 |
| [45] | Patented | Mar. 2, 1971 |

[54] FOOD FEEDER
1 Claim, 5 Drawing Figs.

[52] U.S. Cl. .................................................... 221/86,
221/82, 222/370
[51] Int. Cl. ............................................ G07f 11/54
[50] Field of Search .......................................... 221/86, 82;
198/45; 222/370, 227, 197

[56] References Cited
UNITED STATES PATENTS

| 3,101,872 | 8/1963 | Dickinson ..................... | 222/370X |
| 3,193,155 | 7/1965 | Hazen .......................... | 222/370X |

*Primary Examiner*—David M. Bockenek
*Attorney*—Young and Thompson

ABSTRACT: A feeder for a food breader comprises a power-driven conveyor that rotates about an upright axis and that has a plurality of upright compartments for the reception of food, the compartments registering successively with a chute that feeds the breader.

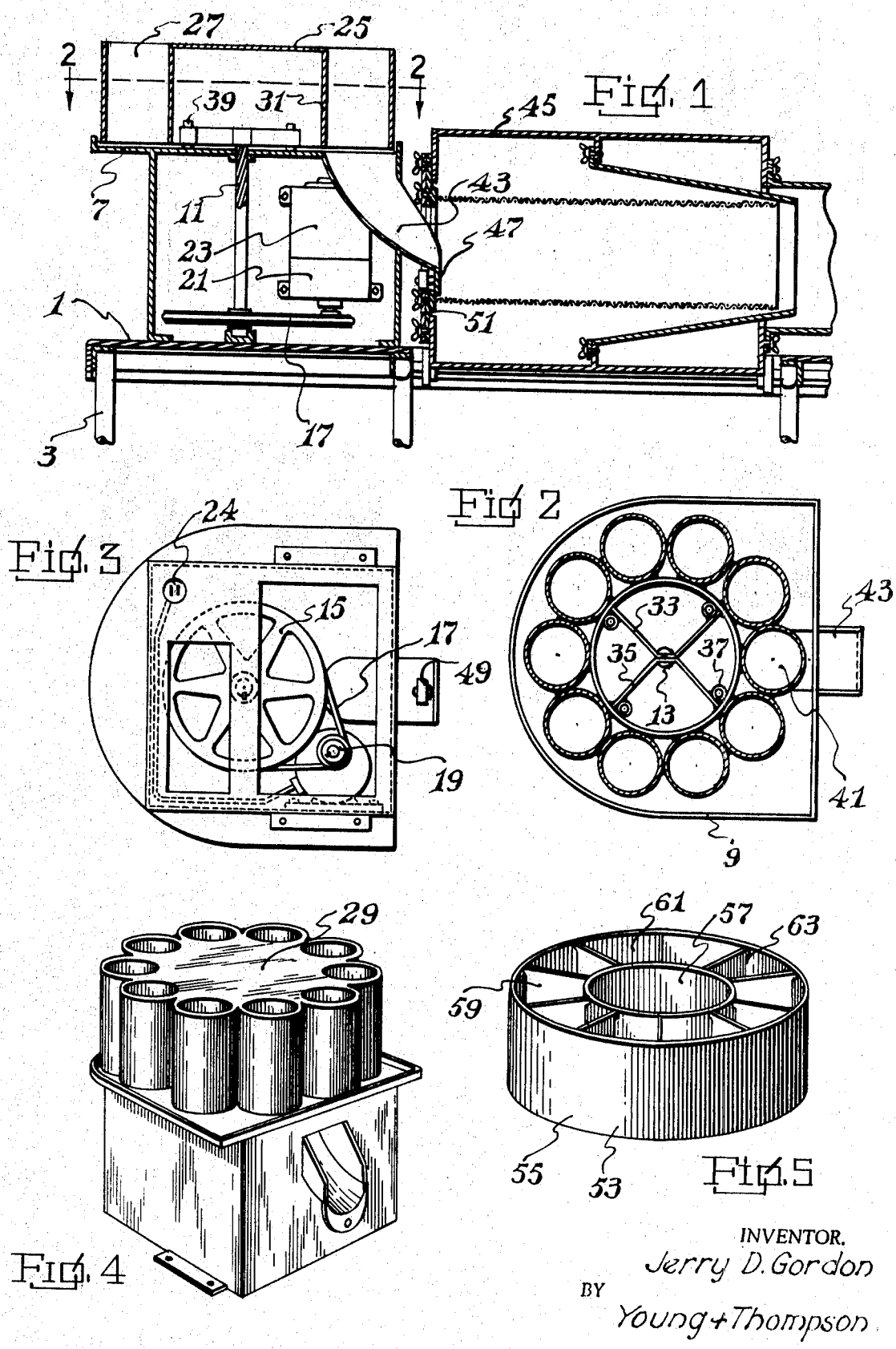

FOOD FEEDER

The present invention relates to food feeders, more particularly of the type in which pieces of food such as fried chicken or shrimp or the like are fed to a breader in preparation for deep frying. The present invention is useful in its broader aspects in connection with the feeding of food to any of a variety of devices; but in its more particular aspects, the invention is especially well adapted for use in feeding food to be breaded in a horizontal rotary drum breader of the type shown in my copending application Ser. No. 697,408, filed Jan. 12, 1968, now U.S. Pat. No. 3,469,561.

An object of the present invention is the provision of a food feeder especially well adapted for the preparation of fried food and the like in restaurants, carryout shops and other establishments in which large quantities of fried foods are dispensed.

Another object of the present invention is the provision of a food feeder which needs to be loaded only occasionally by a worker and which thereafter feeds or dispenses pieces of food at a nicely regulated rate.

Finally, it is an object of the present invention to provide a food feeder which will be relatively simple and inexpensive to manufacture and install, easy to operate, clean, maintain and repair, and rugged and durable in use.

Other objects and advantages of the present invention will become apparent from a consideration of the following description, taken in connection with the accompanying drawing, in which:

FIG. 1 is a side cross-sectional view of a food feeder according to the present invention, in use with a horizontal rotary drum breader;

FIG. 2 is a cross-sectional view on the line 2-2 of FIG. 1;

FIG. 3 is a bottom plan view of the structure shown in FIG. 2;

FIG. 4 is a perspective view of a food feeder according to the invention; and

FIG. 5 is a perspective view of a modified form of rotor for the conveyor of the food feeder of the present invention.

Referring now to the drawing in greater detail, there is shown apparatus according to the present invention, supported on a tabletop 1 which in turn is supported by legs 3 as in conventional commercial kitchen furniture. Securely bolted to tabletop 1 is an open stand of sheet metal, which is closed at its top by a support plate 7 having an upstanding marginal flange thereabout.

An upright rotary conveyor drive shaft 11 is supported at its lower end on a bearing on tabletop 1 and at its upper end is supported by a bearing carried by plate 7. Shaft 11 terminates upwardly in a bifurcated upper end 13. Power to rotate shaft 11 is supplied by a large pulley 15 mounted on the lower end of shaft 11 and driven through a V-belt 17 by a relatively small pulley 19 which in turn is driven by the speed reducer 21 of an electric motor 23 having a plug-receiving socket 24.

Shaft 11 drives in rotation a rotor 25 which is the principal component of the rotary conveyor of the present invention. Rotor 25 is comprised of a plurality of compartments 27 open at their top and bottom and each comprised by an upright open cylinder of sheet metal, the sheet metal cylinders being interconnected at their top by a flat plate 29 and secured as by welding along their inner sides to an upright cylinder 31. A drive spider 33 is provided by a pair of strips 35 of metal which are welded together at their midportion and welded to cylinder 31 at their ends. The midportion of strips 35 is vertically removably received in the bifurcated end 13 of shaft 11 so that rotor 25 will be driven in rotation with shaft 11.

Upright cylindrical sleeves 37 are welded in a corner formed by each junction between an end of a strip 35 and the cylinder 31. Each sleeve 37 carries a plastic insert 39 of solid nylon or the like, each of which extends below the lower ends of sleeves 37 and compartments 27 to space all the metal parts of the rotor 25 above the support plate 7 and to provide a low-friction and sliding but nonscraping support for rotor 25 on plate 7.

A form of rotor alternative to the rotor 25 is shown in FIG. 5. In FIG. 5, a rotor 53 is comprised of an outer cylindrical sheet 55 and an inner cylindrical cylinder 57, the members 55 and 57 being rigidly coaxially interconnected by a plurality of radially extending upright plates 59 which between them define a peripherally extending series of compartments 61. The plates 59 are cut away from the adjacent surfaces of sheet 55 and cylinder 57 at 63, thereby to reduce the length of the corners between the plates 59 and the sheet 55 and cylinder 57 so as to facilitate the cleaning of rotor 53.

Support plate 7 is pierced by an opening 41 of about the same width as a compartment 27. A chute 43 terminates at its upper end in opening 41; and chute 43 extends diagonally downwardly and radially outwardly from the axis of rotation of shaft 11 to terminate within a breader drum 45 such for example as that shown in my above-identified copending application. As will be seen in that copending application, such a breader drum may have a cantilevered discharge end which is unsupported, and which comprises that portion of the breader drum which is out of FIG. 1 to the right. Such a cantilevered portion of a breader drum tends to rock the drum clockwise as seen in FIG. 1 and to counteract this tendency, chute 43 is provided with a downwardly depending flange 47 which on its radially inward side with respect to the axis of rotation of shaft 11 carries a roller 49 which is mounted on flange 47 for rotation about a horizontal axis. As the drum 45 turns, roller 49 rolls on the radially inner surface of an annular feed ring 51 which is secured to and surrounds the entry end of drum 45. Roller 49 thus serves as a holddown roller for drum 45.

The operation of the embodiment of FIGS. 1-4 will now be described, it being understood that the operation of the embodiment of FIG. 5 is the same.

With the parts in the position shown in FIG. 1, all of the compartments 27 are loaded with pieces of food such as chicken or shrimp to be breaded or fried. The plate 7 provides a lower support for the food in the compartments. The motor 23 is then started, and through the speed reducer and the pulley drive reduction, the shaft 11 is turned slowly, so that the compartments 27 successively register with the opening 41 at predetermined intervals. Each time a compartment 27 registers with opening 41, the food in the compartment 27 falls through chute 43 into the breader drum 45 and proceeds through the drum into the frying fat as described in greater detail in the above-identified application. It is thus necessary for the operator only occasionally to load all of the compartments 27, the feeder of the present invention then ensuring that the loaded food is progressively and intermittently discharged to the breader drum at the desired feed rate. The operator is thus free to give his attention to other operations of food preparation until it is time again to load the feeder.

It is a simple matter to remove and replace the rotor of the present invention, as for cleaning or repair. The rotor is simply lifted off so that the midportions of the strips 35 leave the bifurcated upper end 13 of shaft 11. After the rotor has been cleaned or repaired, it is then simply replaced and remains in place by gravity.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

I claim:

1. A food feeder comprising a support plate, a chute extending downwardly from an opening in the support plate, a rotor having a series of peripherally disposed compartments that are open at their tops and closed at their bottoms by the support plate, means for rotating the rotor about an upright axis so that the lower ends of the compartments successively register with said opening and chute, said chute extending downwardly radially outwardly from the axis of rotation of the rotor, said chute being fixed with said support plate, a horizontal rotary drum into which said chute discharges, said drum having an inlet opening surrounded by an annular member, and a roller carried by the lower end of the chute and rotatable about a horizontal axis and engageable with a radially inner surface of said annular member to hold down the inlet end of said drum.